Oct. 16, 1945. B. S. SCOTT 2,386,984
RADIUS CUTTER ATTACHMENT FOR LATHES
Filed Feb. 19, 1943 2 Sheets-Sheet 1
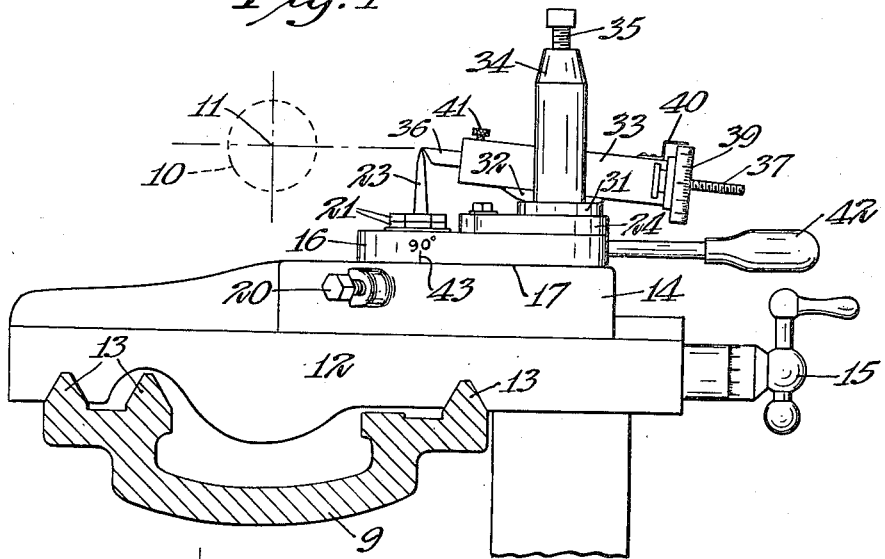
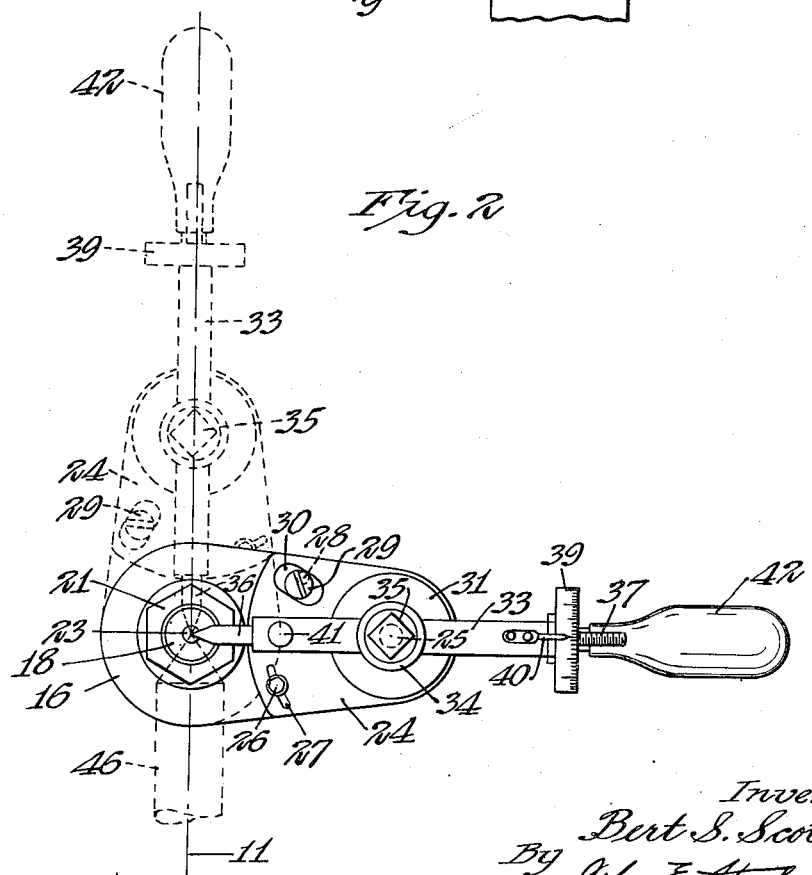
Inventor
Bert S. Scott
By John E. Stryker Jr.
Attorney

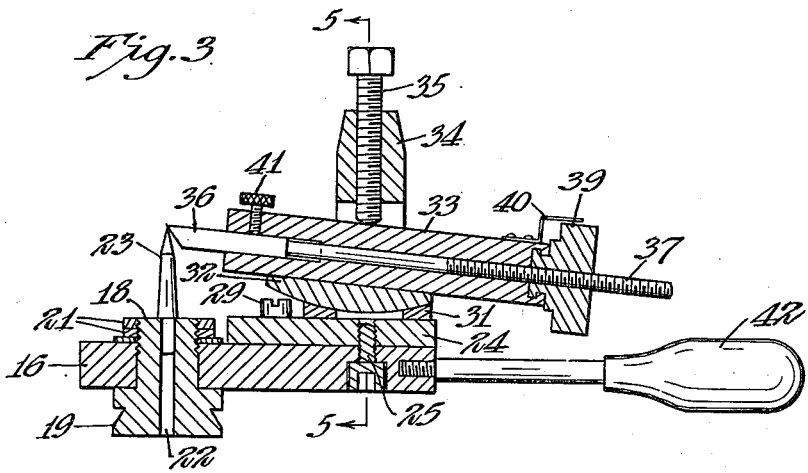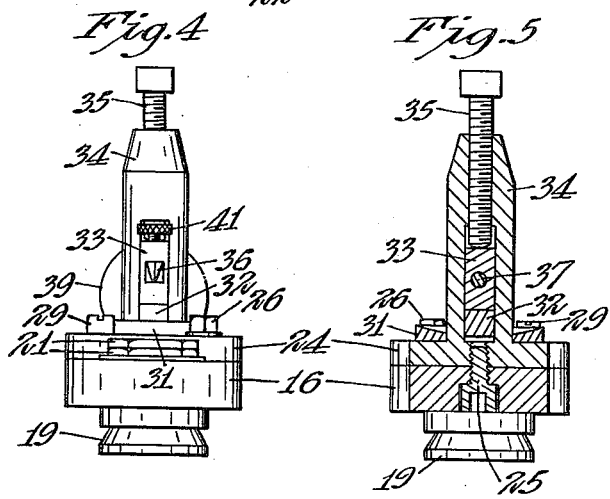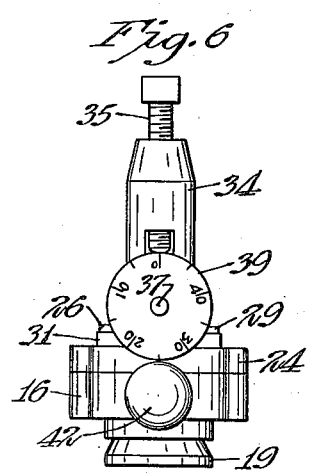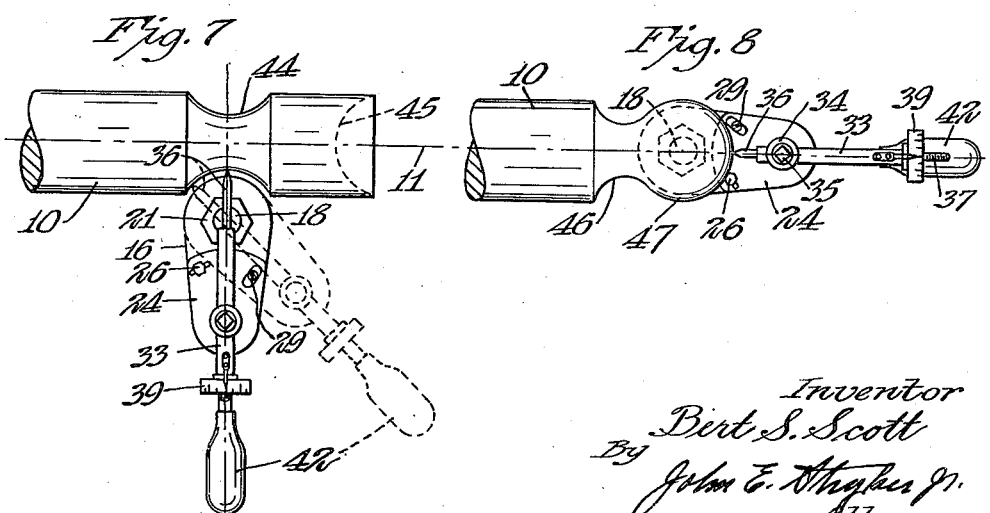

Patented Oct. 16, 1945

2,386,984

UNITED STATES PATENT OFFICE 2,386,984

RADIUS CUTTER ATTACHMENT FOR LATHES

Bert S. Scott, St. Paul, Minn.

Application February 19, 1943, Serial No. 476,409

6 Claims. (Cl. 82—12)

It is an object of this invention to provide a novel radius cutter which is adapted to be substituted for the compound tool rest of standard machine lathes.

A further object is to provide an unusually simple and inexpensive attachment of this character whereby various concave and convex surfaces may be machined accurately to pre-determined radii and with a minimum of preparation and skilled operation.

Other objects will appear and be more fully pointed out in the following specification and claims.

Referring to the accompanying drawings which illustrate the best form of my device at present known to me:

Figure 1 is a side elevation of my improved attachment mounted on the cross feed carriage of a lathe and with the bed of the lathe shown in cross section;

Fig. 2 is a plan view of the attachment;

Fig. 3 is a vertical, longitudinal section through the same;

Fig. 4 is an end elevation showing the front or working end of my device;

Fig. 5 is a vertical section taken on the line 5—5 of Fig. 3;

Fig. 6 is an elevation showing the end opposite from that shown in Fig. 4;

Fig. 7 is a diagrammatic plan view showing my device in positions for cutting a concave surface in the periphery of bar stock, and Fig. 8 is a diagrammatic plan view showing a working position of the attachment in relation to the work where a convexly spherical end surface is to be machined.

Referring to Fig. 1 of the drawings, the numeral 9 indicates the bed of an ordinary lathe, 10 indicates the position of the bar stock or work which is rotated about the axis 11, 12 is the saddle which is movable in the usual manner along the V-ways 13, formed on the bed and 14 is the cross feed carriage which is movable at right angles to the axis 11 by means of the cross feed screw 15. It will be understood that these elements are all standard on ordinary lathes.

My improved attachment has a base plate 16 which extends horizontally on the horizontal machined surface 17 formed on the top of the carriage 14. Near one end of the plate 16 a vertical cylindrical bearing is formed therein to receive a pivot member 18 formed with a head 19 on its lower end adapted to fit in the bearing which is ordinarily provided in the cross feed carriage 14 to receive the compound rest base of a standard lathe. The head 19 is firmly gripped in the bearing by suitable set screws 20 (Fig. 1), one at each side of the carriage. A pair of lock nuts 21 are threaded on the upper end of the pivot member 18 and engage a suitable washer in contact with the top surface of the plate 16 to hold this plate in firm engagement with an annular shoulder formed on member 18 above the head 19. This connection with the carriage 14 permits the plate 16 supporting my radius cutter to be oscillated horizontally about the vertical pivot member 18.

An axial bore 22 is formed in the member 18 to removably receive the lower end of a centering pin 23 having a pointed upper end located at the same elevation as the lathe axis 11 and also on the continuation of the axis of pivot member 18. The cutting edge or point of a tool may be set accurately at various radial distances from the tip of pin 23 in establishing the radii of the finished cuts and the centers for the several cuts may be properly located either directly beneath the axis 11 or to either side and below the work by appropriate movement of the cross feed carriage 14, as more fully hereinafter described.

Horizontally adjustable on the top of the base plate 16 is a second plate 24 having a plane horizontal bottom surface engaging a similar top surface of the plate 16. A vertical pivot screw 25 connects the plate 24 to the plate 16 for movement about a vertical axis which is eccentric to the axis of the pivot member 18. The plate 24 is also connected to the plate 16 by a set screw 26 passing through an arcuate slot 27 (Fig. 2), the arc of the slot being concentric with the screw 25. To afford an accurate adjustment for the lateral movement of the plate 24 relative to the plate 16 I also provide a pin 28 having a pivot bearing in the plate 16 and a cylindrical eccentric head 29 fitting in an elongated bearing 30 formed in the plate 24. The upper end of the head 29 is formed to be engaged by a tool to turn it and thereby change the position of the plate 24 when the set screw 26 has been loosened.

A tool post ring 31 is rigidly fastened on the top of the plate 24, concentrically relative to the screw 25, and fitting on the top of this ring is a tool post rocker 32, of the usual construction, adapted to support a tool holder 33. Integral with the ring 31 is a tool post 34 formed with a vertically elongated bearing for the tool holder 33 and provided with a long set screw 35 extending axially downward in a tapped bore to engage the tool holder 33. The latter is formed with a longitudinally extending bore to slidably receive a tool bit 36 and a feed screw 37. This screw 37 is connected to the bit 36 at one end and projects from the opposite end of the tool holder where it is formed with an elongated thread which fits in a tapped axial bore in a knob 39 having a rotary connection with the tool holder 33 such that the knob may be turned to feed the screw and tool bit to and from the work relative to the tool holder. The periphery of the knob 39 is marked with a micrometer scale adapted to indicate the magnitude of the tool movement by reference to an index finger 40 (Figs. 1 and 2) which is fixed on the tool holder body. A set screw 41 is provided near the opposite end of the tool holder to engage the bit 36 and firmly clamp it when in operation.

To facilitate manual turning of the base plate 30 about its pivot member 18, I provide a handle 42 which is rigidly fastened to said plate and projects therefrom along the radius of the member 18 extending through the axis of the pivot screw 25. This radius is located in the vertical plane which includes the axis of the feed screw 37 when the angle of the latter has been adjusted for operation. To indicate the horizontal angle of this vertical plane relative to the vertical plane including the longitudinal axis of the cross feed carriage 14, the base plate 16 is graduated in degrees, as indicated at 43, and the top surface of the carriage 14 has index marks extending to the scale 43. The important positions of the tool support which must be accurately determined and indicated on the scale 43 are the 90 degree position, indicated in full lines in Figs. 1, 2 and 7, and the zero position (coinciding with the vertical plane through the lathe axis 11), shown in dotted lines in Fig. 2 and in full lines in Fig. 8.

Referring to Figs. 7 and 8, typical concave and convex machined surfaces which may be formed by the use of my attachment are illustrated. One of the most difficult types of surfaces to machine accurately on an ordinary lathe is a concave peripheral surface such as that illustrated at 44 in Fig. 7. To adjust my attachment to machine the surface 44, the pin 23 is placed in its vertical socket 22 and with the bed plate 16 in its 90 degree position indicated in full lines in Figs. 1 and 2 the cross feed carriage 14 is moved to cause the point of the pin 23 to coincide with the axis 11 of the lathe, this pin being preformed so that its point extends along the axis of the pivot member 18 to the elevation of the axis 11. Now the plate 16 is swung 90 degrees to its zero position, indicated in dotted lines in Fig. 2, and with the tool bit 36 mounted in the holder 33 it is advanced by turning knob 36 and by adjusting its position in the post 34 (when necessary) in order to locate its cutting edge or point as near as possible to the vertical plane through the lathe axis 11. The final, close adjustment of this plane may be made by reference to the pointed end of the tail stock 46, indicated in dotted lines in Fig. 2. This adjustment is made after loosening the screw 26 by turning the eccentric head 29 on the pin 28 to bring the point of the tool exactly in line with the point of the tail stock 46. At this time the elevation of the tool edge may be adjusted by loosening the set screw 35 and tilting the tool holder on the rocker 32.

As the next operation, the bed plate 26 may be swung to its 90 degree position and after removing the pin 23 the point of the tool may be advanced beyond the center of the pivot 18 a distance corresponding to the radius of the surface 44 to be machined. Thus if the radius of this surface is to be equal to one-half of an inch, the point of the tool is advanced by operating the knob 39 one-half inch beyond the axis 11. As the next step, the cross feed screw 15 is operated to carry the tool rest back out of the working position and the work is now set up in the lathe for machining and to rotate about the axis 11. Without changing the position of the knob 39 or spacing of the tool relative to the axis of pivot member 18 the cross feed is now operated to bring the point of the tool 36 into operative relation to the work 10 and successive arcuate cuts are run with the lathe in operation and by alternately moving the plate 16 carrying the tool about the axis of the pivot member 18 and advancing the tool toward the work using the cross feed screw 15. It will be evident that the radius of the cut remains constant throughout this operation and when the arcuate cut has been advanced to the desired depth in the stock, the curvature of surface 44 will have the predetermined radius.

To machine a concavely spherical end surface, such as that indicated at 45 in Fig. 7, the procedure for aligning the axis of the tool with the axis 11 of the lathe is the same as that hereinbefore described but the vertical axis for the radius cutter, comprising the pivot member 18, may be moved to a fixed position at the end of the work such that this axis intersects the axis 11 at the center of the arc to be cut. With the axis of the pivot member 18 fixed in this position, the knob 39 is operated to move the cutter radially of the cut and the handle 42 is operated to move the tool edge in a substantially horizontal plane through the axis 11. For this cut the elevation of the tool 36 is adjusted so that its cutting edge will reach the elevation of the axis 11 as the cut is finished.

Where a convexly spherical surface, such as the surface 47 shown in Fig. 8, is to be formed adjoining or in continuation of a concave surface 48 the latter may be machined first by procedure similar to that herein described for forming the surface 44 and then the axis of the pivot member 18 may be moved beneath the work to a position where it intersects the lathe axis 11. In this case the point of the tool 36 is first retracted toward the post 34 to clear the work while retaining the pivot member 18 in its centered position. The tool is then oscillated about its fixed center and is advanced for the successive cuts by operating the knob 39 until a spherical surface of the desired diameter has been formed.

From the foregoing description it will be evident that my attachment makes it possible to operate the cutting edge of the tool precisely and rapidly at the elevation of the lathe axis and in arcs located either beyond the axis of the pivot member 18, as shown in Fig. 7, or short of that axis, as indicated in Fig. 8, and that the centers for the several arcs may be located either directly beneath the work or at various distances to one side of the vertical center plane of the lathe. By providing readily operable means for establishing the centers and radii of the several cutter arcs in predetermined accurate relation to the axis of the lathe, I greatly facilitate precision work by relatively unskilled operators. The removal of my attachment and substitution of a standard tool rest on the cross feed carriage may be accomplished quickly and easily after merely loosen the set screws 20 and withdrawing the head 19 from its bearing in the cross feed carriage 14.

Having described my invention, what I claim as new and desire to protect by Letters Patent is:

1. In an attachment for a lathe having a cross feed carriage and a plane top surface formed on said carriage, the improvements which comprise, in combination, a tool base extending horizontally on said surface, pivot means connecting one end of said base to said carriage and permitting oscillation of said base about a vertical axis, said end of the base and pivot means being formed to pass beneath work extending along the lathe axis of rotation, a tool post mounted on said base eccentrically to said pivot means, a tool holder mounted on said post, a tool adapted to project from said holder above said pivot means, a screw feed connected to the tool for actuating it radially of said pivot means, means for setting the cutting edge of the tool in various positions spaced from said vertical axis, indicator means associated with said vertical axis for locating it in the vertical plane through the lathe axis, a support for the tool movable laterally of said screw feed and means for fixing said support relative to said base to direct the screw feed movement of the tool radially of said vertical axis.

2. In an attachment for a lathe having a cross feed carriage and a plane top surface formed on said carriage, the improvements which comprise, in combination, a tool base extending horizontally on said surface, pivot means connecting one end of said base to said carriage and permitting oscillation of said base about a vertical axis, said end of the base and pivot means being formed to pass beneath work extending along the lathe axis of rotation, an indicator scale concentric with said pivot means and associated with said base and carriage to indicate the angle of the base relative to the cross feed axis, a tool post pivotally mounted on said base eccentrically to said pivot means, a tool mounted on said post and having a cutting edge adapted to project above said pivot means, a screw feed connected to the tool for actuating its cutting edge radially of said pivot means, means for setting the cutting edge of the tool in various positions spaced from said vertical axis, indicator means associated with said vertical axis for locating it in the vertical plane including the lathe axis and means for adjusting the angle of said screw feed relative to said base to direct the screw feed movement of the tool radially of said vertical axis.

3. In an attachment for a lathe having a cross feed carriage and a plane top surface formed on said carriage, the improvements which comprise, in combination, a tool base extending horizontally on said surface, pivot means connecting said base to said carriage and permitting oscillation of said base about a vertical axis, said pivot means and adjacent portion of the base being formed to pass beneath work extending along the lathe axis of rotation and said cross feed carriage being operable to move said base and pivot means crossways of the lathe axis of rotation to various positions, a tool post pivotally mounted on said base to turn about an axis which is parallel to said vertical axis and spaced therefrom horizontally, a tool projecting laterally of the post, a screw feed connected to the tool for actuating it radially of said pivot means, means accessible when the tool is in operative position on said carriage for adjusting the angle of the tool and screw feed relative to the base to direct the tool in a vertical plane including said vertical axis and indicator means associated with said vertical axis for locating it in the vertical plane including the lathe axis.

4. In an attachment for a lathe having a cross feed carriage and a horizontal top surface formed on said carriage, a tool base supported on said surface, pivot means connecting said base to said carriage and permitting oscillation of the base about a vertical axis, said pivot means and the adjacent portion of the base being formed to pass beneath work extending along the lathe axis of rotation and said cross feed carriage being operable to move said base and pivot means crossways of the lathe axis of rotation to various positions, a tool post mounted on said base eccentrically to said pivot means, a tool projecting laterally from said post, means for moving said tool radially of said pivot means and a gauge pin attachable to said base, extending upward along said vertical axis and having its upper end at the elevation of the lathe axis to facilitate the accurate location of said tool relative to the lathe axis of rotation.

5. In an attachment for a lathe, the combination with a cross feed carriage having a horizontal top surface, of a tool base supported on said surface, pivot means connecting said base to said carriage and permitting oscillation of the base about a vertical axis, said pivot means and the adjacent portion of the base being formed to pass beneath work extending along the lathe axis of rotation and said cross feed carriage being operable to move said base and pivot means crossways of the lathe axis of rotation to various positions, a tool post mounted on said base eccentrically to said pivot means, a tool mounted on said post, means supported on said base for feeding said tool radially of the vertical axis of said pivot means to working positions above and at opposite sides of said pivot means and lateral adjustment means supported on said base and accessible when said tool is in operative position on said carriage for directing said tool feed means radially of said vertical axis.

6. In an attachment for a lathe, the combination with a cross feed carriage having a horizontal top surface, a tool base supported on said surface, pivot means connecting said base to said carriage and permitting oscillation of the base about a vertical axis, said pivot means and the adjacent portion of the base being formed to pass beneath work extending along the lathe axis of rotation and said cross feed carriage being operable to move said base and pivot means crossways of the lathe axis of rotation to various positions, a tool post pivotally mounted on said base to turn about a vertical axis which is eccentric to said pivot means, a tool projecting laterally from said post, means for moving said tool radially of the vertical axis of said pivot means and means accessible when said tool is in operative position on said carriage for clamping said post against pivotal movement on the base to direct said tool moving means radially of the vertical axis of said pivot means.

BERT S. SCOTT.